(12) United States Patent
Bruestle et al.

(10) Patent No.: US 10,592,213 B2
(45) Date of Patent: Mar. 17, 2020

(54) PREPROCESSING TENSOR OPERATIONS FOR OPTIMAL COMPILATION

(71) Applicant: Intel Corporation, Santa Clara, CA (US)

(72) Inventors: Jeremy Bruestle, Seattle, WA (US); Choong Ng, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/787,494

(22) Filed: Oct. 18, 2017

(65) Prior Publication Data

US 2018/0107456 A1     Apr. 19, 2018

Related U.S. Application Data

(60) Provisional application No. 62/409,975, filed on Oct. 19, 2016.

(51) Int. Cl.
*G06F 8/30* (2018.01)
*G06N 20/00* (2019.01)
(Continued)

(52) U.S. Cl.
CPC .............. *G06F 8/30* (2013.01); *G06F 8/40* (2013.01); *G06F 8/41* (2013.01); *G06F 8/42* (2013.01); *G06F 8/423* (2013.01); *G06F 8/436* (2013.01); *G06F 8/443* (2013.01); *G06F 8/445* (2013.01); *G06F 8/447* (2013.01); *G06F 8/4441* (2013.01); *G06F 8/45* (2013.01); *G06F 9/45533* (2013.01); *G06F 17/12* (2013.01); *G06F 17/16* (2013.01); *G06N 3/0454* (2013.01); *G06N 3/063* (2013.01); *G06N 20/00* (2019.01)

(58) Field of Classification Search
None
See application file for complete search history.

(56) References Cited

U.S. PATENT DOCUMENTS

| 7,571,435 | B2 * | 8/2009 | Gustavson | G06F 9/3001 708/495 |
| 2006/0080645 | A1 * | 4/2006 | Miranda | G06F 8/443 717/137 |
| 2015/0378696 | A1 * | 12/2015 | Boehm | G06F 8/45 717/149 |

OTHER PUBLICATIONS

A. Hosangadi, "Optimizing Polynomial Expressions by Algebraic Factorization and Common Subexpression Elimination", Aug. 2006, IEEE Transactions on Computer-Aided Design of Integrated Circuits and Systems, vol. 25, Issue 10.*

* cited by examiner

*Primary Examiner* — Francisco J Aponte
*Assistant Examiner* — Mark A Gooray
(74) *Attorney, Agent, or Firm* — Hanley, Flight & Zimmerman, LLC

(57) ABSTRACT

Techniques to preprocess tensor operations prior to code generation to optimize compilation are disclosed. A computer readable representation of a linear algebra or tensor operation is received. A code transformation software component performs transformations include output reduction and fraction removal. The result is a set of linear equations of a single variable with integer coefficients. Such a set lends itself to more efficient code generation during compilation by a code generation software component. Use cases disclosed include targeting a machine learning hardware accelerator, receiving code in the form of an intermediate language generated by a cross-compiler with multiple front ends supporting multiple programming languages, and cloud deployment and execution scenarios.

11 Claims, 3 Drawing Sheets

(51) Int. Cl.
*G06F 17/16* (2006.01)
*G06N 3/063* (2006.01)
*G06N 3/04* (2006.01)
*G06F 8/41* (2018.01)
*G06F 8/40* (2018.01)
*G06F 9/455* (2018.01)
*G06F 17/12* (2006.01)

PREPROCESSING TENSOR OPERATIONS FOR OPTIMAL COMPILATION

CROSS-REFERENCE TO RELATED APPLICATIONS

This patent application claims benefit of priority from Provisional Patent Application Ser. No. 62/409,975, entitled "Method for Automated Generation of Efficient Implementation of Tensor Operations," filed Oct. 19, 2016, which is hereby incorporated by reference herein in its entirety.

BACKGROUND

Machine learning techniques, and by extension cognitive learning techniques, involve extensive use of linear algebra and tensor mathematics. As such techniques lend themselves to parallel processing computational techniques, a variety of graphical processing units (GPUs) and other parallel computing capable hardware are targeted. Often this hardware is hosted in the cloud.

Since a proliferation of hardware platforms may be targeted, hosting a machine learning application presently involves custom coding to a chosen hardware platform. Typically a machine learning application will start as source code, which is subsequently compiled into object code and/or executable code specific to the chosen hardware platform.

However, compilation of source code targeting parallel platforms is difficult. Compilers might not be able to take advantage of parallelism on the hardware platform, and may generated essentially non-parallel code. Furthermore, some transformations during code generation may not be possible, or may be computationally intensive. Accordingly, preprocessing techniques, such as first pass compilation techniques, may lend themselves to compilation of source code containing linear algebra and tensor operations.

BRIEF DESCRIPTION OF THE DRAWINGS

The Detailed Description is set forth with reference to the accompanying figures.

DETAILED DESCRIPTION

Context of Preprocessing Tensor Operations for Optimal Compilation

There is a rich history of using computer programs to transform a computer readable representation of an algorithm into transformed representation. For example, compilation is the process of receiving a computer readable representation of an algorithm, usually in the form of source code, and transforming the received representation into computer executable instructions, usually in the form of an executable program. Cross compilation is the process of receiving a computer readable representation for a first computing platform and transforming it into a computer readable representation for a second computing platform. The second computing platform need not be an executing platform. Indeed, a cross compiler may simply convert a received computer representation into an intermediate representation to be subject to subsequent transforms.

As stated above, machine learning and cognitive networks make use of linear algebra and tensor mathematics. Since linear algebra and tensor mathematics lends itself to parallel processing, parallel processing hardware platforms are generally targeted. However, compilation of parallel processing algorithms in general is notoriously difficult. Compilers often do not recognize how to convert source code into parallel code, and thereby create executables that do not fully exploit parallelism in the targeted network. As a result, often programmers resort to extensive hand-coding and other interventions, obviating the advantages of compilation by computers.

This state of affairs leads to a reluctance to port parallel applications, such as machine learning and cognitive network applications, across platforms. A programmer may learn that a different platform is better suited for an application, but the investment of hand coding already performed for the original platform, compounded with the prospect of additional extensive hand coding for the different prospective platform is likely to deter embarking on a porting project.

To address these problems, this application discloses cross-compiling to an intermediate language, in this case called TILE, and subsequently compiling the intermediate language to a targeted platform.

In particular, this subsequent compilation is the subject matter of this application. Some linear algebra and/or tensor constructs may not be readily compiled to a chosen hardware platform. Or if the constructs may be compiled, the process may be computationally intensive, or otherwise not optimal. Accordingly, this application discloses performing preprocessing operations to optimize subsequent code generation during compilation. In particular, the techniques disclosed, relate to preprocessing linear algebra and/or tensor constructs represented in a computer readable representation, such as source code in a programming computer language or an intermediate language such as TILE.

Figure 1:
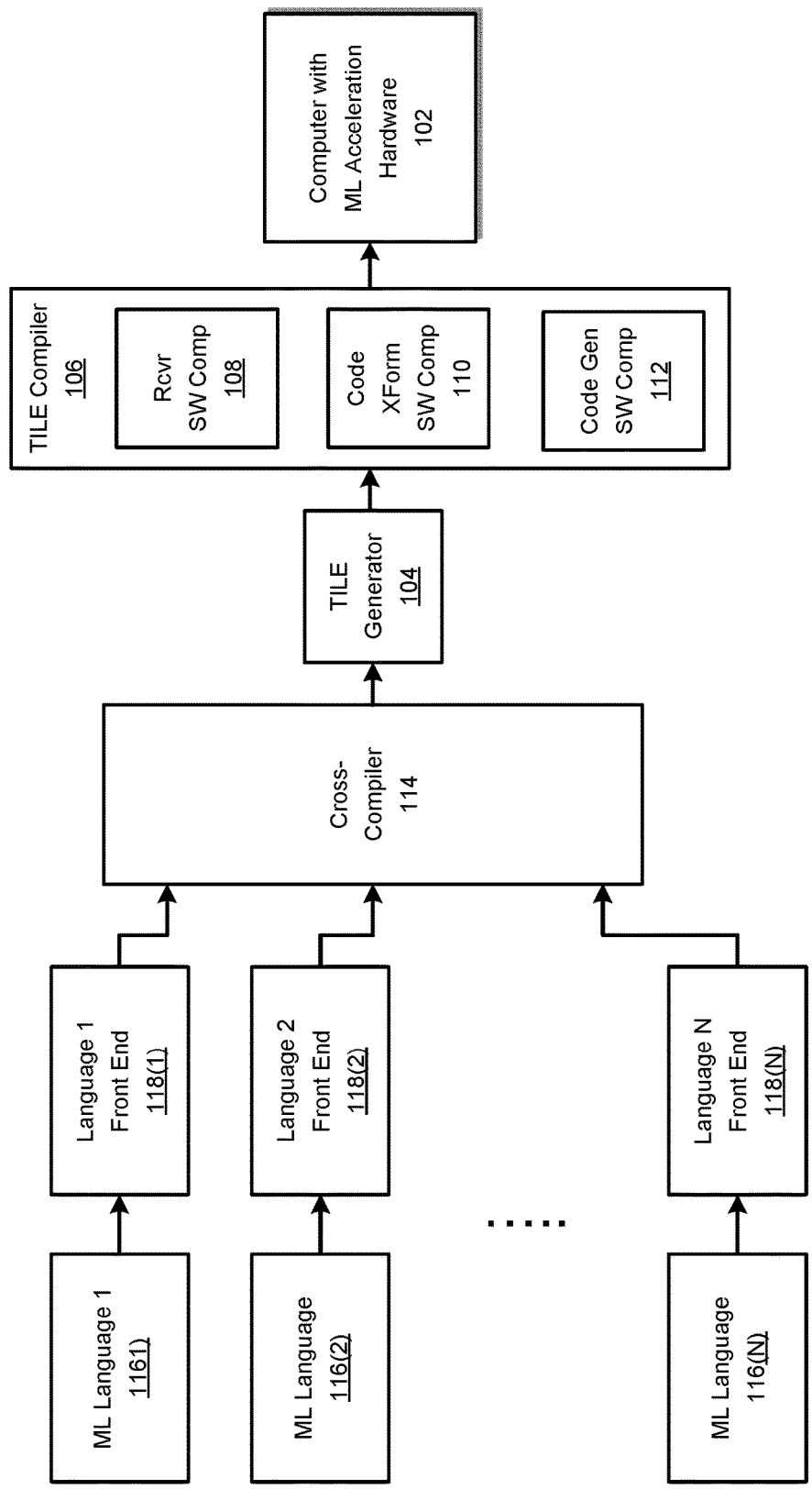
FIG. 1 is a top level context diagram for preprocessing tensor operations for optimal compilation.

FIG. 1 is a top-level context diagram 100 for preprocessing tensor operations for optimal compilation according to the present disclosure. A machine learning (ML) acceleration hardware is usually employed by, or embedded in, a chosen targeted computing platform 102, which is to ultimately run a ML application. A compiling computing device (not shown) takes in intermediate code generated by TILE generator 104 and forwards it to TILE compiler 106.

TILE compiler 106 comprises a receiving software component 108, which receives a compumter readable representation of one or more algorithms. One example of such a representation is the TILE intermediate code. The receiving software component 108 then stores the code in a computer readable memory.

Computer-readable memory includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

A code transformation software component 110 manipulates the received representation and performs preprocessing transformations to simplify and optimize subsequent code generation. Once the code transformation software component 110 completes transforming the received representation, a code generation software component generates computer executable instructions for the target computing platform 102. This process is described in more detail with respect to FIG. 3, and in the subsequent discussion around specific transforms including output reduction and fraction removal.

It is to be emphasized that the compiler 106 need not be specific to TILE or to intermediate languages, but may receive source code in many programming languages provided that proper programming language bindings are implemented.

However, cross platform computing is also enabled via a cross-compiler 114. Specifically, the cross-compiler 114 may receive source code for ML programs in different programming languages 116(1) through 116(N). The received source code may be routed to a corresponding ML language front end 118(1) through 118(N) which is able to lex and parse the received source code. The output of the front ends 118(1) through 118(N) then is routed to the cross-compiler 114 for generation into TILE or some other intermediate language in common. In this way, multiple languages are supported and multiple targeted hardware platforms may be targeted. Turning to the subject matter of this disclosure, preprocessing transforms as performed by the code transformation software component 110, such transforms not only aid in optimizing the compilation process, but also enable the compiler 106 to be more flexible in receiving input from a wide range of platforms.

Figure 2:
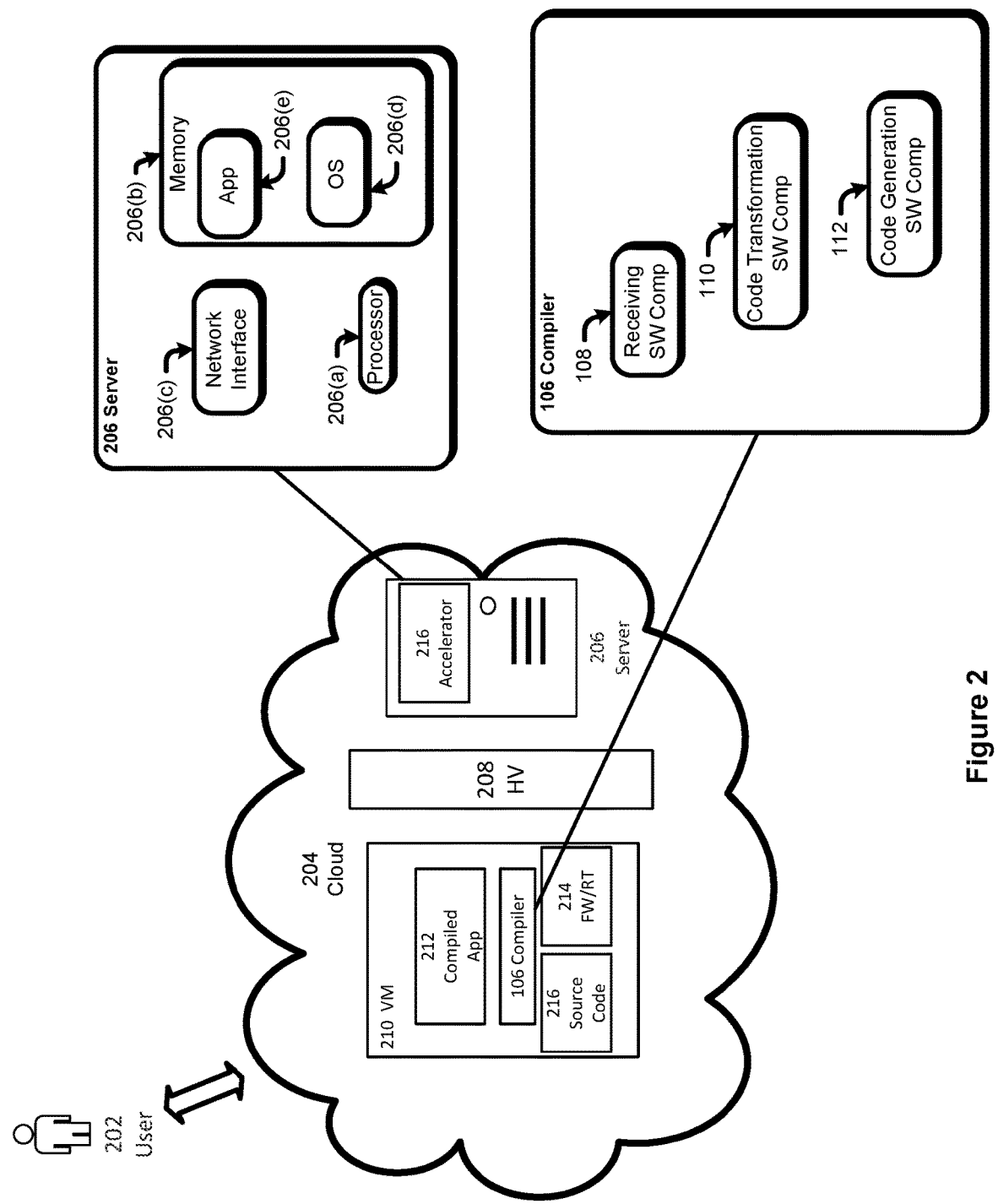
FIG. 2 is a block diagram of an example computing environment for preprocessing tensor operations for optimal compilation.

Exemplary Environment for Preprocessing Tensor Operations for Optimized Compilation FIG. 2 provides an environmental diagram 200 in which preprocessing tensor operations for optimized compilation may occur. Specifically, a user 202, accesses computing services from cloud 204. The user may be a developer or may be an end user.

Cloud 204 is comprised of several servers 206 capable of storing computer readable data and executing computer readable instructions. Those servers 206 may be disaggregated by a hypervisor 208 to serve virtual machines 210.

A compiled ML application 212 may execute either directly on a server 106 or on a virtual machine 110. The server 106 and/or the virtual machine 110 may be provisioned by one or more ML frameworks and/or runtimes 214. A ML hardware acceleration unit 216 may be connected to a server 106 or may be standalone. As a resource of a server 106, a ML hardware acceleration unit may be disaggregated as well by hypervisor 108 thereby making its resources available to a virtual machine 110.

The compiled ML application 212 is a result of source code 216 for the ML application as compiled by compiler 106. The ML application 212 may also have been linked to libraries specific to the ML frameworks or runtimes 214. As described with respect to FIG. 1 above, the compiler 106 may comprise a receiving software component 108, configured to receive source code 216. The compiler 106 may further comprise code transformation software component 110 and code generation software component 112, where the former performs transformations to optimize code generation by the latter. This process is described in further detail with respect to FIG. 3 and in the subsequent discussion around specific transforms including output reduction and fraction removal.

Turning back to the ML hardware accelerator unit 216, it may comprise a system control block that among other operations may transfer instruction. It may interface with a controlling CPU from server 206 or virtual machine 210 via a communications bus. The ML hardware accelerator unit may have an instruction interpreter that interfaces with local memory, one or more multicast networks and a plurality of execution units. The interface with offboard data may be via a data transfer unit interfacing over a memory bus.

Exemplary Method for Preprocessing Tensor Operations for Optimal Compilation

Figure 3:
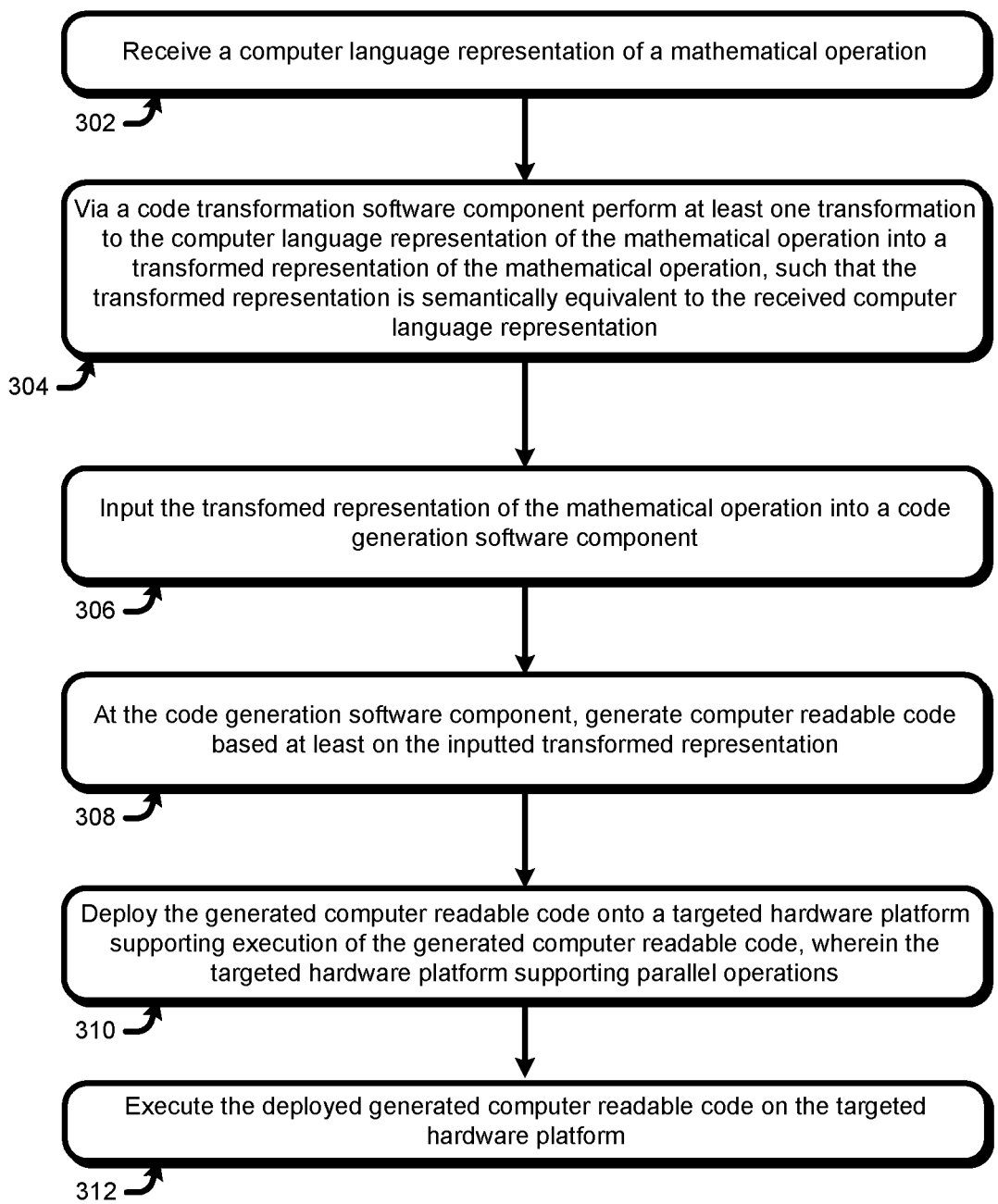
FIG. 3 is a flow chart for preprocessing tensor operations for optimal compilation.

Notwithstanding the larger context of the compiler 106, as stated above it is notoriously difficult to compile parallel programs. Accordingly, this disclosure describes a preprocessing pass to transform tensor operations while preserving the semantics of those operations. In the preprocessing pass, an original computer readable representation of a mathematical operations is transformed into a form that will either enable generation of code, or may optimize generation of code. Optimization of generation may be in the form of using less computational cycles than without the transformation, or in other optimizations. FIG. 3 is a flow chart 300 of this preprocessing of tensor operations. Specifics about particular transformations, such as for output reduction and fraction removal are described in greater detail in subsequent sections.

In block 302, a computer readable representation is received by receiver software component 108. A computer readable representation is data format that may be processed by a computer. Generally, the receiver software component 108 will have prior knowledge of grammar rules adhered to by the computer readable representation. Computer readable representations include binary files and text files, as well as binary streams and text streams. Computer readable representations typically are in the form of source code.

The computer readable representations will generally contain at least one mathematical operation. The mathematical operation may be a linear algebra/tensor operation. The operation may be common to ML applications.

Upon receiving the computer readable representation, in block 304, a code transformation software component 110 will perform at least one preprocessing transformation to the received computer readable representation to create a transformed representation.

Common transformations may include the performance of an output reduction transformation followed by a fraction removal transformation. These transformations are described in greater detail in the subsequent sections.

In block 306 the resulting transformed representation is input to a code generation software component 112 which in block 308 generates computer executable code 212 based at least on the transformed representation. Specifically, the code generation software component 112 generates computer executable instructions that may be executed by a target hardware platform 102.

The executable code comprises a compiled application 212 which may then be deployed for execution in block 312. The target platform may be a virtual machine 210 or alternatively a docker container hosted on the cloud 204 and may be deployed via orchestration/developer operations software such as Chef.

Exemplary Preprocessing Transformations

The TILE language (Tensor Intermediate Language Engine) is a compact language for describing dense linear algebra operations such as convolution, matrix multiplication, or max pooling. TILE is also designed to allow machine code generation, i.e. compilation similar to many programming languages for efficient execution on highly parallel processor architectures such as Graphical Processing units (GPUs), traditional vector processors, systolic arrays, or purpose-built application specific integrated circuits (ASIC). These dense linear algebra operations include the computations comprising machine learning workflows including deep neural networks. In addition, the TILE representation lends itself to simple automatic differentiation. Below are some example descriptions of common operations:

Matrix multiply:

$$C[y,x] \mathrel{+}= (A[y,i]*B[i,x])$$

Convolution (2d, 2,2 stride):

$$C[n,x,y,co] \mathrel{+}= (A[n,2x+i,2y+j,i]*B[i,j,ci,co])$$

Max pooling:

$$O[x,y] \mathrel{=>} (I[2*x+i,2*y+j]), i<2, j<2.$$

Derivative of convolution:

$$dA[n,2x+i,2y+j,i] \mathrel{+}= (dC[n,x,y,co]*B[i,j,ci,co])$$

$$dB[i,j,ci,co] \mathrel{+}= (A[n,2x+i,2y+j,i]*dC[n,x,y,co])$$

In this syntax, index variables (i, j, etc.) are presumed to operate over integers, and unless otherwise constrained, operate on every value which is not out-of-bounds for a tensor access. Any variables appearing only on the right hand side are automatically accumulated over. For these, '+' represents summation and > represents a maximum accumulation.

Transforming the TILE representation to optimized platform-specific code such as OpenCL, CUDA, SPIR-V, or processor-specific machine code is challenging. TILE operations are compiled in two major stages. During the first stage, simplification, a number of mathematical transforms on the original operation are performed, resulting in a new version of the operation which meets certain criteria which simplify later analysis, but otherwise performs the same operation. Specifically, the original operation is "flattened" which removes the dimensionality of tensors, keeping only stride information. This simplified and flattened version of the operation is then passed to the second stage, code generation, during which it is further analyzed and turned into code for the platform in question. It is during the code generation stage when thread assignment, memory layout, tiling (for cache optimization) and other related steps are performed. Finally, the generated code is emitted. This document focuses on the first of these stages, simplification.

The simplification process of TILE operations in turn happens in two primary stages: output reduction, and fraction removal. The first stage, output reduction, modifies the operation to make a semantically identical operation for which all of the output polynomials are simple, meaning the polynomials are mathematically linear in a single variable. The second stage, fraction removal, modifies the operation to make a semantically identical operation which has only integral polynomial coefficients. Both of these stages use a process called bound generation to determine the bounds for various polynomials.

Bound Generation

As stated above, both stages of the simplification process, output reduction and fraction removal, make use of bound generation. Specifically, during the analysis of a TILE operation, we are interested in determining for a set of n index variables, and a set of constraints, the bounds of the index variables, and the bounds of various polynomials of the index variables.

Constraints to TILE operations come from two sources. First, there is an implied constraint that the index variables access a valid entry within a tensor. In other words, in index variables access a dimension in fact represented by a tensor. The second source of constraints are user specified constraints. Constraints from both sources have the same form, which asserts that a polynomial of the index variables results in an integer i in the range $0 \leq i < r$ for some integer r. Note that the constraint that i is an integer is critical, as it represents the set of constraints that define a bounded lattice of points rather than a simple bounded region.

There is also an implied constraint that all index variables are integral themselves, meaning that the lattice is always a sub-lattice of $\mathbb{Z}^n$ ($\mathbb{Z}^n$ is the set of integer vectors of dimension n). Given a combination of these constraints, and the requirement that they all must be true simultaneously, we can arrive at both a lattice basis, which defines the repeating pattern of points in the n dimensional space of index variables, as well as a tighter set of bounds for each of the original constraints. It may be the case that a set of constraints results in an empty set, or a lower dimensional lattice, which must be handled appropriately as an empty operation, or an operation with few index variables.

Technical Description

We write [0, r) as the set integers $\{x \in \mathbb{N} \mid 0 \leq x < r\}$ ($\mathbb{N}$ is the set of non-negative integers) rather than it's usually meaning of a half-open range in the set of reals. A constraint has the form of a linear multivariate polynomial with rational coefficients and a integer range. For example, a constraint might be:

$$3x + \frac{1}{2}y + 6 \in [0, 5)$$

In general, we usually rename our index variables to $u_i$ for $1 <= i <= n$, so in canonical form, the above constraint might be written:

$$3u_1 + \frac{1}{2}u_2 + 6 \in [0, 5)$$

If we have a set S consisting of m constraints, the mutual satisfaction of all constraints can be represented in the form:

$$\sum_{i=1}^{N} C_{j,i} u_i + o_j \in [0, r_j), \text{ for all } \{1 \leq j \leq M\}$$

This means that the input to the problem can be defined via a m×n rational matrix of coefficients C, an m long rational vector of offsets o, and an M long vector of natural numbered ranges, r.

The goal of bound generation is to determine a new set, S', of "minimal" constraints which take into account the intersection of the original set of constraints. This output set is represented in the same way as the input, by a matrix C' and two vectors o' and r'. For each original constraint in S, there must be a constraint in the output set S', which is linearly related to the original constraints, and has the minimal value for r. In addition, each element in S' should be linearly independent of all other elements. To compute S', we first need to know the lattice spacing of the intersection of the constraints, as well as any offsets of the lattice from the origin. To that end, we ignore the specific range of a given constraint, and view it as a requirement:

$$\sum_{i=1}^{N} C_{j,i} u_i + o_j = k, k \in \mathbb{Z}$$

This essentially makes each constraint into a set of equidistant hyperplanes. The intersection such a set of hyperplanes with a lattice always results in another lattice (possibly empty). Thus by induction starting from the assumption that all index variables are integral (defining the lattice $\mathbb{Z}^n$) and intersecting with each constraint in turn, we arrive at another lattice. Any such lattice can be represented as a matrix and an additional vector of "offsets". Specifically, we define a lattice by a square rational matrix H, which we require to be in Hermite Normal Form and a vector of rational offsets p, where $0 <= p_i < 1$. The element of the lattice L are then:

$$L = \{u \in \mathbb{Z}^n : Hu - p \in \mathbb{Z}^n\}$$

Given such a representation, we describe below how to compute H and p from C and o. Then, once this is done, we show how to use H and p to minimize the range of each of the original constraints. The union of these minimized constraints forms the output set S'.

Method

The overall method for Bound Generation operates as follows:

1. Compute the Hermite Normal Form H of C, along with the unimodular matrix U which transforms C into H. This is also referred to as the Hermite decomposition. That is find a a Hermite normal matrix H and a unimodular matrix U such that H=UC. This algorithm is polynomial time and well studied, so it will not be described further here.

2. Compute q=U.o

3. Define p as $p_i = \text{frac}(q_i)$, where $\text{frac}(x) = x - \lfloor x \rfloor$.

4. If $p_i \neq 0$ for any i>n, return failure, since the set of constraints is infeasible.

5. Initialize S':=∅

6. For each constraint i in S, compute the minimized constraint using H and p as follows:

6(a) Take the constraint's coefficients, c, aka row i of C, as well as the offset $o = o_i$ and range $r = r_i$.

6(b) For each j, $1 \leq j \leq n$, compute the multiplier $m_j$, such that $c_j = m_j H_{j,j}$, i.e. $m_j = c_j / H_{j,j}$. Because H was generated using C, these should all be integers.

6(c) Compute the lowest common multiple m of all the nonzero multipliers $m_j$. Since the constraint must always have one valid coefficient, there is always at least one nonzero multiplier.

6(d) Compute the lattice offset, $$1 = \text{frac}\left(\sum_{j=0}^{n} m_j p_j\right).$$

6(e) Compute the offset modulus difference, d=(o−mo')% m, which is an integer [0, m).

6(f) Compute the updated offset, o'=(o−d)/m, the range $r' = \lfloor (r-d)/m \rfloor$, and coefficients, c'=c/m.

6(g) If the minimized constraint has range 0, exit early with error. Otherwise combine into S' as follows:

6(g)i. If there is no other constraint in S' with the same set of coefficients, simply add the constraint to S' and continue.

6(g)ii. Otherwise, find the existing constraint with the same value of c. Let $o_1$, $r_1$ be the offset and range of the constraint to be added, and $o_2$, $r_2$ be the offset and range of the existing constraint.

6(g)iii Compute $o = \min(o_1, o_2)$ and $r = \min(r_1 - o_1, r_2 - o_2) - o$.

6(g)iv. If the resulting range is less than or equal to zero, exit early with error.

6(g)v. Otherwise update the o and r values of the entry in S'.

7. Return the final set, S' as a matrix of constraints, C', and two vectors o' and r'.

Output Reduction

Because the output tensor for a TILE operation may include non-trivial polynomial expressions, different index assignments may actually refer to the same output location in memory. For example, consider the operation:

$$O[i+j] = +(I[i] * K[j])$$

Here both i=0, j=1 and i=1, j=0 will be accumulated into the same output element O[1]. When considering parallel execution, this presents a problem. Specifically, if the same output value is accumulated into across multiple threads, some sort of synchronization must be done, which for many architectures (such as that of a GPU) is extremely costly in terms of efficiency. Therefore, it is desirable to modify the index polynomials such that the indexes can be divided into two sets, output indexes and accumulation indexes, where each possible index assignment for output indexes results in a unique output memory location, and accumulation indexes walk over all the values on the right hand side which accumulate into that output location. To be concrete, for the example above, imagine we construct two new indexes, $v_0$ and $v_1$, such that:

$$v_0 = i + j$$

$$v_1 = i$$

Algebraically, we can solve for i and j, resulting in:

$$i = v_1$$

$$j = v_0 - v_1$$

Inserting these value into our original TILE operation:

$$O[i+j] = +(I[i] * K[j])$$

we arrive at:

$$O[v_0] = +(I[v_1] * K[v_0 - v_1])$$

Once the operation is in this form, it is valid to assign one thread to each $v_0$, and have that thread loop over values of $v_1$ doing accumulations. Although in practice TILE uses a more complex thread assignment mechanism, restructuring the operation's indexes to allow them to be divided into an output set of indexes, $\{v_0\}$, and an accumulation set $\{v_1\}$, provides a great deal of simplification to thread assignment.

Technical Description of Output Reduction

We are given a set $O = \{o_i\}$ of output polynomials over a set of index variables $U = \{u_j\}$, where each output polynomial is in the form of $o_i = \sum_j m_{i,j} u_j$, and $m_{i,j}$ are rational numbers.

Here we presume that any constants which were part of the original output polynomials in the TILE operation have been removed. We are also given a ordered set of constraint polynomials $C=\{c_i\}$ of the same form, $c_i=\Sigma_j n_{i,j} u_j$. These are generated from the bound generation step described above, and are ordered by the range of the constraint (i.e. $r_i$), smaller widths first, with any offsets being ignored. We seek as output, a set of new index variables $V=\{v_j\}$, and for each original index variable, a polynomial in the form $u_i=\Sigma_j t_{i,j}*v_j$, such that when substituted into the original tile operation causes the index variables $v_j$ divide into two sets. The first of these, j<K, is the set of output indexes, for which every possible assignment produces a distinct output element. The second of these is the accumulation set, j>=K, such that the $v_j$ appears only on the right hand side of the tile operation. In addition, we desire the range of all of the values $v_{j,j}>=K$ to be minimized, so that the total work of accumulation is minimized. We can represent our inputs as two matrixes, $M=m_{i,j}$ which is |U|×|O| elements, and $N=n_{i,j}$ which is |U|×|C| elements. We wish to compute a transformation matrix $T=t_{i,j}$, which is |U|×|V| elements, and meets the criteria described above.

Method of Output Reduction

Intermediates and Starting State

To perform the transformation above, we begin with the two input matrixes above, M, and N. We define the following additional intermediates:

B—a matrix representing a set of basis vectors for some set of polynomials currently added.

R—a reduced representation of the basis set to allow quick determination of whether a given polynomial is linearly dependent of the values in B.

p—a vector of integers for each row of R specifying which element is the 'pivot' element. Both of the above matrixes always have |U| columns and initially contain 0 rows. The vector also begins as an empty vector.

Adding a Single Basis Vector

Adding a basis vector is a sub-task of both steps 1 and 2 below, and we define it here. The vector to be added will be called x here.

1. Define a "reduced" version of x, y, and set it initially equal to x.

2. For each row i in R

2(a) Compute multiplier: $a=y_{pi}$

2(b) Reduce component $p_i$: $y=y-aR_i$

3. Find a j such that $y_j \neq 0$. If no such j is found, x was linearly dependent on B, and return an error.

4. Otherwise, if j was found, normalize y: $y=y/y_j$.

5. Append x to B, y to R, and j to p

6. Return a success indicator.

Step 1: Add Basis Vectors from Output Polynomials

For each output polynomial in M (i.e. each row $M_i$ of M), attempt to add the output polynomial to the basis. If it's linearly dependent, just continue to the next output basis. Set K to the current number of rows in B. If the number of rows in B is now equal to |U|, go immediately to step 3.

Step 2: Add Basis Vectors from Constraint Polynomials

For each constraint polynomial in N (i.e., each row $N_i$ of N), attempt to add the constraint polynomial to the basis. If it's linearly dependent, just continue to the next constraint basis. If the number of rows in B is now equal to |U|, go immediately to step 3. If after adding all constraints, the number of rows in B remains less than |U|, the reduction process fails due to underspecified constraints. This implies that the original TILE operation was invalid, and accordingly return error.

Step 3: Compute Matrix Inverse

Compute the rational matrix inverse of B. Since each row of B was linearly independent by construction, and the matrix is square, this will always succeed. This inverse matrix is the transformation matrix T as described above.

Step 4: Rewrite TILE Operation

At this point, we can rewrite the original TILE operation in terms of the new set of index variables V by replacing each of the original index variables in U by it's polynomial formula in terms of V and simplifying the resulting polynomial. In this rewritten from, only the first K indexes will effect the output, and each possible index assignment will generate a unique output memory address. However, the TILE operation will otherwise perform the exact same set of operations. That is, it is equivalent to the original TILE operation. We call this form of the tile operation the "Output Reduced" form.

Example of Output Reduction

By way of example, we apply the Output Reduction process as described above to the following TILE operation:

$$O[k,2k+5,k-2j] \mathrel{+}= (A[5i-2,-3j]*B[2i+k,3k]), i<5$$

First, we rename the index variable to a consistent form:

$$u_1=i, u_2=j, u_3=k$$

Our output polynomials are now:

$$u_3, 2*u_3+5, u_3-2*u_2$$

The full set of constraint polynomials is defined from the operation, but the determination of ordering is based on the sizes of each tensor as well, and determined by the Bound Generation step. We presume that the ordered output is as follows:

$$2*u_1+u_3, u_1, 2*u_3+5, u_3, -3*u_2, u_3-2*u_2, 5*u_1-2, 3*u_2$$

Converting these to a matrix notation, we find:

$$M = \begin{bmatrix} 0 & 0 & 1 \\ 0 & 0 & 2 \\ 0 & -2 & 1 \end{bmatrix} N = \begin{bmatrix} 2 & 0 & 1 \\ 1 & 0 & 0 \\ 0 & 0 & 2 \\ 0 & 0 & 1 \\ 0 & -3 & 0 \\ 0 & -2 & 1 \\ 5 & 0 & 0 \\ 0 & 0 & 3 \end{bmatrix}$$

We add the first row of M, (0,0,1), to the basis vectors, which results in:

$$B=[0\ 0\ 1]\ R=[0\ 0\ 1]\ p=[2]$$

The second row of M fails to add because it is linearly dependent. Adding the third row, (0, −2, 1) results in:

$$B = \begin{bmatrix} 0 & 0 & 1 \\ 0 & -2 & 1 \end{bmatrix} R = \begin{bmatrix} 0 & 0 & 1 \\ 0 & 1 & 0 \end{bmatrix} p = \begin{bmatrix} 2 \\ 1 \end{bmatrix}$$

Next, we start adding rows from N. The first row (2, 0, 1), results in:

$$B = \begin{bmatrix} 0 & 0 & 1 \\ 0 & -2 & 1 \\ 2 & 0 & 1 \end{bmatrix} R = \begin{bmatrix} 0 & 0 & 1 \\ 0 & 1 & 0 \\ 1 & 0 & 0 \end{bmatrix} p = \begin{bmatrix} 2 \\ 1 \\ 0 \end{bmatrix}$$

At this point, B is square, so we go to step 3 and compute its inverse. At this point, B logically represents the following equations (for clarity, keeping the variables as i, j, k rather than $u_1$, $u_2$, $u_3$):

$$v_1 = k$$

$$v_2 = 2j + k$$

$$v_3 = 2i + k$$

The actual inverse is:

$$T = \begin{bmatrix} 0 & 0 & 1 \\ 0 & -2 & 1 \\ 2 & 0 & 1 \end{bmatrix}^{-1} = \begin{bmatrix} -\frac{1}{2} & 0 & \frac{1}{2} \\ \frac{1}{2} & -\frac{1}{2} & 0 \\ 1 & 0 & 0 \end{bmatrix}$$

This represents the equations:

$$i = -\frac{1}{2}v_1 + \frac{1}{2}v_3$$

$$j = \frac{1}{2}v_1 - \frac{1}{2}v_2$$

$$k = v_1$$

Applying these to the original operation results in the following transformed operation:

$$O[v_1, 2v_1 + 5, v_2] =$$
$$+A([-5/2v_1 + 5/2v_3 - 2][-3/2v_1 + 3/2v_2] * B[v_3, 3v_1]),$$
$$-1/2v_1 + 1/2v_3 < 5$$

While the operation is more complex, the output indexes are now all single variable polynomials, which is the goal of the transformation.

Fraction Removal

Once an operation has been transformed so that its output indexes are simple, the next step is to remove non-integral coefficients. For tile operations with fractional coefficients, it's possible for the a combination of index values to result in a tensor access which is non-integral. Logically, these operations are skipped, however, it would add additional code complexity to test for this case. Additionally, in some cases the number of skipped operations is significantly more than the number of actual operations, thus it is inefficient to enumerate cases only to skip them. However, in most cases it is possible to modify the operations by adding additional indexes to remove fractional multipliers while retaining the requirement that indexes can be divided into output indexes and accumulation indexes, such that each unique assignment to output indexes accesses a distinct output.

Method of Fraction Removal

To perform fraction removal, we begin with the operation produced by Output Reduction as described above. We then extract the set of constraints for the new operation using the bound generation process as described above. From these constraints, we take the matrix C of coefficients.

We then perform the following steps, where hnf(X) represents the Hermite Normal Form of X, and sq(X) is the "square" part of matrix, that is, for a matrix with r rows and c columns, where r>c, the first c rows of the matrix.

1. Compute N=sq(hnf(C)), the squared Hermite Normal Form of the matrix C

2. Compute the normalized dual D of N, D=sq(hnf $((N^T N)^{-1} N))$

Next, we use D to find appropriate "splits" for the various indexes. The idea is that for each index, it is divided into sub-indexes, each which represent various components of the original index. These are chosen such that when the formula for the original index, now as components, is substituted back into the original operation, all fractional multipliers vanish. Additional constraints are added to ensure that the sub-indexes do not violate the output rules.

The output of the splitting process is a new set of index variables, W={$w_i$}, a polynomial in W for each of the original index variables represented by a matrix T, $v_i = \Sigma T_{i,j} W_j$, and a set of additional constraints C, of the form $0 <= w_i < m_i$. We require a vector of vectors, L, where the size of each vector $L_i$ may differ. We also keep track of the number of elements in all of the lists in L before a given index in a vector of accumulations, a. To compute the split representation for each index, we do the following:

1. Initialize the counter, n, of new index variable to be generated to 0.

2. For each index i, $1 \le i \le |V|$:

2(a) Initialize the set of splits for index i, S:=∅

2(b) For each index j, $i \le j \le |V|$:

2(b)i. If $D_{i,j}=0$, ignore this entry j.

2(b)ii. Otherwise, compute $s=D_{j,j}/\gcd(D_{i,j},D_{j,j})$

2(b)iii. Union into S, S:=S∪{s}.

(c) Set $L_i$ to a vector containing the elements of S, sorted in order from lowest to highest.

(d) Assign $a_i = n$.

(e) n:=n+|$L_i$|.

3. Construct the set of index variable W={$w_i$}, $1 \le i \le n$.

4. Construct a zero initialized T, as a |V|×n matrix.

5. For each index i, $1 \le i \le |V|$:

5(a) For each index k, $1 \le k < |L_i|$:

5(a)i. $T_{i,aj+k} = D_{j,j} * L_{i,k}$

5(a)ii. if k≠|$L_i$|:

5(a)(ii)A. Compute $m = L_{i,k+1}/L_{i,k}$

5(a)(ii)B. If m is not integral, the fraction removal fails, return error C. Add constraint $0 \le w_{ai+k} < m$ to C.

(b) For each index j, $1 \le j < i$:

5(b)i. For each index k, $1 \le k < |L_j|$:

5(b)(i)A. if $L_{j,k} < D_{i,i}$ then $T_{i,aj+k} := D_{j,i} * L_{j,k}$

Once this is done, we can use the matrix T to translate the original operation and its existing constraints into a new set of index variables. Due to the structure of the operation, this will remove any fractions. Finally we add any of the newly generated constraints as well.

Example of Fraction Removal

We start with the output from the example reduction:

$$O[v_1, 2v_1 + 5, v_2] =$$
$$+A([-5/2v_1 + 5/2v_3 - 2][-3/2v_1 + 3/2v_2] * B[v_3, 3v1]),$$
$$-1/2v_1 + 1/2v_3 < 5$$

This gives us a C, N, and finally D matrix of:

$$C = \begin{bmatrix} 1 & 0 & 0 \\ 2 & 0 & 0 \\ 0 & 1 & 0 \\ -\frac{5}{2} & 0 & \frac{5}{2} \\ \frac{3}{2} & \frac{3}{2} & 0 \\ -\frac{3}{2} & \frac{3}{2} & 0 \\ 0 & 0 & 1 \\ 3 & 0 & 0 \\ -\frac{1}{2} & 0 & \frac{1}{2} \end{bmatrix} \quad N = \begin{bmatrix} \frac{1}{2} & 0 & \frac{1}{2} \\ 0 & \frac{1}{2} & \frac{1}{2} \\ 0 & 0 & 1 \end{bmatrix} \quad D = \begin{bmatrix} 1 & 1 & 1 \\ 0 & 2 & 0 \\ 0 & 0 & 2 \end{bmatrix}$$

At this point, we perform the second stage, finding:

$L_1 = \{2, 1\}, L_2 = \{1\}, L_3\{1\}$ $W = \{w_1, w_2, w_3, w_4\}$ $T = \begin{bmatrix} 1 & 2 & 0 & 0 \\ 0 & 0 & 2 & 0 \\ 0 & 0 & 0 & 2 \end{bmatrix}$ $C = \{0 \le w_1 < 2\}$ Transforming the operation based on this, we arrive at:

$O[w_1+2*w_2,5+2*w_1+4*w_2,w_1+2*w_3]=+A([-2+-5*w_2+5*w_4,-3*w_2+3*w_3]*B[w_1+2*w_4,3*w_1+6*w_2],$ $0<=w_1<2$ $0<=-w_2+w_4<5$

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to generate computer readable instructions, the method comprising:
    transforming, by executing an instruction with at least one processor of a computing device, using an output reduction transformation, a computer language representation of a mathematical operation to create a first transformed representation of the mathematical operation, the first transformed representation including a set of one or more polynomials that are linear in a single variable and semantically equivalent to the computer language representation;
    transforming, by executing an instruction with the at least one processor of a computing device, using a fraction removal transformation, the first transformed representation of the mathematical operation to create a second transformed representation of the mathematical operation, the second transformed representation including a set of one or more polynomials that have one or more integer coefficients and are semantically equivalent to the first transformed representation; and
    generating the computer readable instructions for parallel processing, the computer readable instructions generated based on the second transformed representation.

2. The method of claim 1, wherein the computer language representation includes any one of:
    matrix multiplication;
    convolution;
    max pooling; or
    a derivative of a convolution.

3. The method of claim 1, wherein the generation of the computer readable instructions from the second transformed representation of the mathematical operation takes less time computationally than generating computer readable instructions based on the computer language representation of the mathematical operation.

4. The method of claim 1, wherein the computer language representation is of a machine learning linear algebra operation.

5. The method of claim 1, wherein the first and second transformations of the computer language representation includes performing bound generation.

6. The method of claim 1, wherein the computer readable instructions are executable on a computing device.

7. The method of claim 6, wherein the generating of the computer readable instructions includes at least one of:
    thread assignment;
    memory layout; or
    cache optimization.

8. A system to perform preprocessing of computer readable representations of mathematical operations, the system comprising:
    a processor;
    a memory including instructions that, when executed, cause the processor to at least:
    perform an output reduction transformation to transform a computer readable representation of a machine learning mathematical operation into a first transformed representation including a set of one or more polynomials that are linear in a single variable, the first transformed representation semantically equivalent to the computer language representation;
    perform a fraction removal transformation to transform the first transformed representation of a machine learning mathematical operation into a second transformed representation including a set of one or more polynomials that have one or more integer coefficients and semantically equivalent to the first transformed representation; and
    generate computer readable instructions for parallel processing, the computer readable instructions generated based on the second transformed representation.

9. The system of claim 8, wherein the processor is to generate the computer readable instructions in view of a target machine learning operation hardware accelerator that more optimally targets parallel processing.

10. The system of claim 8, wherein the processor and memory are virtual and are provided via a hypervisor.

11. Computer storage media comprising instructions that, when executed, cause at least one processor to at least:
    perform an output reduction transformation to transform source code including a linear algebra operation into a first transformed representation including a set of one or more polynomials that are linear in a single variable, the first transformed representation semantically equivalent to the source code;

perform a fraction removal transformation to transform the first transformed representation including a set of one or more polynomials that are linear in a single variable into a second transformed representation including a set of one or more polynomials that have one or more integer coefficients, the second transformed representation semantically equivalent to the first transformed representation; and generate computer readable instructions for parallel processing, the computer readable instructions generated based on the second transformed representation.

\* \* \* \* \*